United States Patent [19]
Ohuchi et al.

[11] Patent Number: 5,590,459
[45] Date of Patent: Jan. 7, 1997

[54] DEVICE FOR SUCCESSIVELY INSERTING RIVETS AND THE LIKE INTO A LONG CONTINUOUS RIVET-HOLDING BELT

[75] Inventors: Masatoshi Ohuchi; Shuichi Mizuta, both of Koriyama, Japan

[73] Assignee: Opt Engineering Co., Ltd., Koriyama, Japan

[21] Appl. No.: 361,732

[22] Filed: Dec. 22, 1994

[30] Foreign Application Priority Data

Jun. 8, 1994 [JP] Japan ..................... 6-148753

[51] Int. Cl.⁶ .................. B23Q 7/10; B23P 19/00
[52] U.S. Cl. .................. 29/809; 29/823; 29/243.5; 29/281.4
[58] Field of Search ................. 29/809, 811.2, 29/812.5, 813, 823, 243.51, 793, 243.5, 281.1, 281.4

[56] References Cited

U.S. PATENT DOCUMENTS 3,622,039  11/1971  Lindstrom ............. 29/809 X
4,062,108  12/1977  Cottrell .................. 29/809

*Primary Examiner*—Peter Vo
*Assistant Examiner*—Khan V. Nguyen
*Attorney, Agent, or Firm*—Lackenbach Siegel Marzullo Aronson & Greenspan, P.C.

[57] ABSTRACT

A rivet inserting device for inserting multiple rivets and the like into a rivet-holding belt or device omprising a hopper containing the rivets, a rotatable rivet-receiving wheel having a plural of flanges installed on both sides of a core portion, and having grooves receiving the rivets one by one displaced in the specified distance on the peripheries of the flanges, a rivet-feeding route installed between the hopper and the rivet-receiving wheel, shaped as a slit having a width lager than the diameter of the stem portions of rivets, and smaller than the diameter of the head portion thereof. A revolving roller is located in the neighborhood of the hopper across the rivet-feeding route and is provided with a groove along the axial direction on the periphery thereof. A guide member guides the rivet-holding belt along the rivet-receiving wheel, and a squeezing member installed facing a portion of the peripheral edge of the rivet-receiving wheel pushes the rivets located in the grooves of the rivet-receiving wheel into the holding holes of the rivet-holding belt, and a driving device for driving the rivet-receiving wheel and the revolving roller.

3 Claims, 14 Drawing Sheets

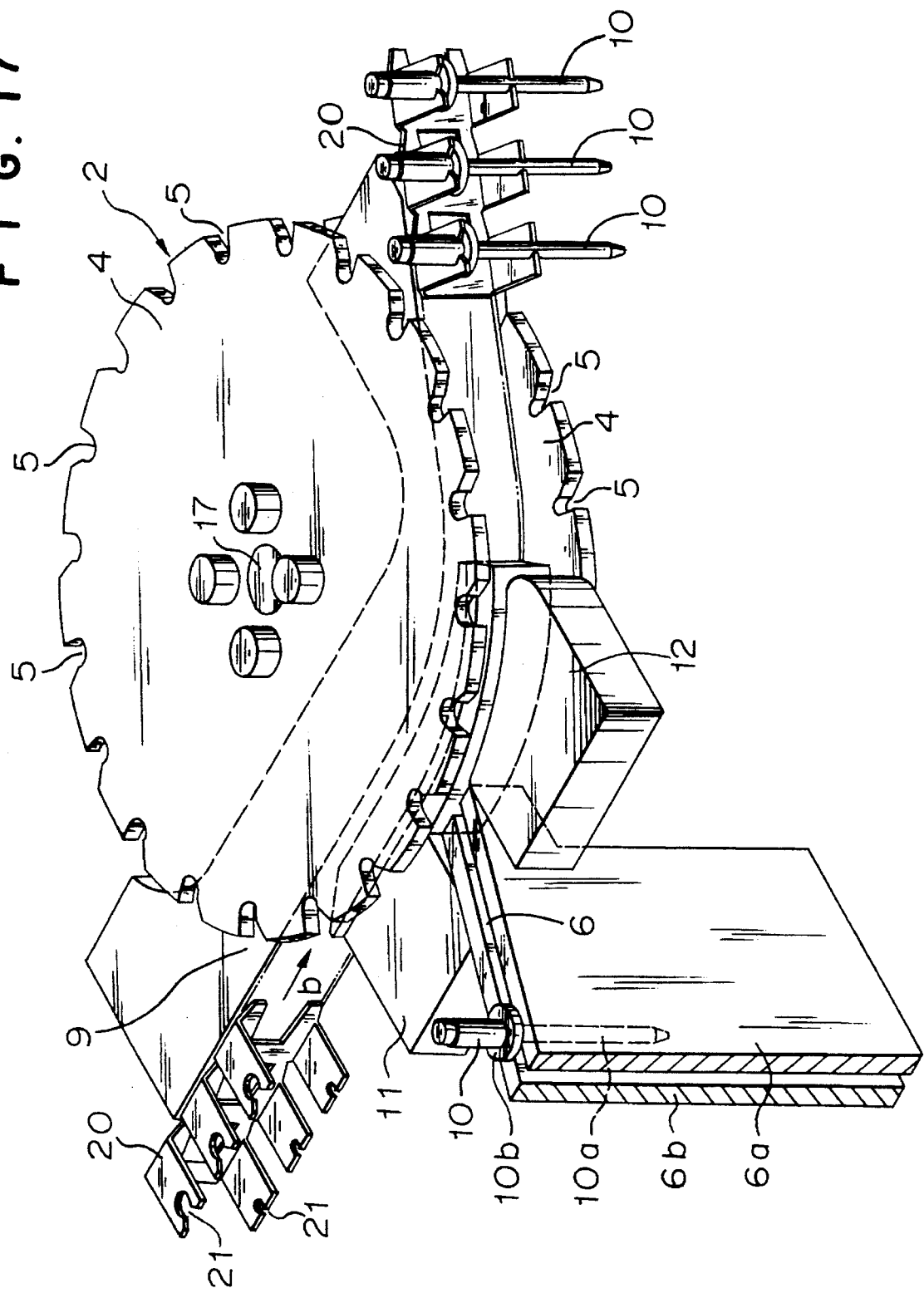

DEVICE FOR SUCCESSIVELY INSERTING RIVETS AND THE LIKE INTO A LONG CONTINUOUS RIVET-HOLDING BELT

BACKGROUND OF THE INVENTION

This invention relates to a device for successively inserting fixing materials such as nails, rivets and small thread screws (hereafter referred to as "rivets and the like") into a long continuous rivet-holding belt and, in particular, relates to a device for inserting successively rivets and the like into the holding holes provided in the rivet-holding belt in the specified pitch along the axial long direction of the belt after the rivets and the like are aligned vertically in series in an aligning and supplying device particularly designed.

Up to the present, the rivets and the like used in a continuous riveting machine or in a nail driver are inserted in a lengthy holding belt, and supplied by installing the rivet-holding belt in the continuous riveting machine and the like. In general, the user buys and uses the rivet-holding belt having the rivets and the like therein, but the emptied belt is disposed of after only one usage.

However, as it is uneconomical to dispose of the rivet-holding belt after only one usage, certain users reused the used rivet-holding belt. However, as there was no adequate device for reinserting new rivets and the like into the emptied belt, the user had to insert them into the belt one by one by hand. However, as this is both cumbersome and requires considerable manpower and time to insert one by one by hand, it becomes beneficial to provide a small-sized compact device enabling automatic and continuous insertion of many rivets and the like into the emptied holding belt. In light of the above drawbacks, the first object of the present invention is to provide a small and easily operated device enabling the automatic and continuous insertion of many rivets and the like into the rivet-holding belt.

The second object of the present invention is to provide a small and easily operated device having an aligning and supplying device enabling vertical alignment in series of the rivets and the like thrown into the hopper at random and accurate and sufficient supply of the aligned rivets and the like to a delivering position located before the rivet-receiving wheel.

The third object of the present invention is to provide an aligning and supplying device of the rivets and the like, enabling he rivet-receiving wheel and the aligning feeder to be driven with a single driving shaft.

BRIEF DESCRIPTION OF THE INVENTION

To attain the above objects, the invention cited in claim 1 is characterized by comprising an aligning device for letting the rivets and the like vertically stand in line, and an inserting device for continuously inserting the rivets and the like into the rivet-holding belt, and a driving device for driving the aligning device and the rivet-inserting device.

The former aligning device comprises:

a hopper containing the rivets and the like;

a rivet-feeding route installed between the hopper and a rivet-receiving wheel described hereafter, shaped in a slit having a width larger than the diameter of the stem portion of the rivet and the like and smaller than the diameter of the head portion thereof; and a revolving roller located in the neighborhood of the hopper across the rivet-feeding route, provided with a groove along the axial direction on the exterior thereof.

The latter rivet-inserting device is comprised with:

a rivet-receiving wheel having a plural of flanges installed on both sides of a core portion, and provided with a series of grooves enabling the rivets and the like to be held one by one therein, above each periphery of the flanges, and further installed horizontally so as to be rotatable;

a guide member for guiding the rivet-holding belt along the rivet-receiving wheel;

a squeezing member installed facing a portion of the peripheral edge of the rivet-receiving wheel for pushing the rivets and the like located in the groove of the rivet-receiving wheel into the holding boles of the rivet-holding belt.

In this invention, as the hopper has sufficient space to contain the rivets and the like, and as there is a feed route as a slit connected between the hopper and the rivet-receiving wheel, it then becomes possible to supply the rivets and the like into the rivet-receiving wheel.

In this case, the rivets and the like contained in the hopper are dropped into the feed route successively by the groove on the revolving roller at every rotation of the roller, and as the feed route like a slit has a breadth larger than the diameter of the step portion and smaller than the diameter of the head portion of the rivets and the like, then the rivets and the like are supplied in the condition that the head portions of the rivets and the like are placed on the feeding route and the stem portions are hung in the feeding route.

As on each periphery of the rivet-receiving wheel, the grooves for containing the rivets and the like one by one are apart a specified distance from each other, the rivets and the like supplied by the rotation of the rivet-receiving wheel are inserted in these grooves one by one.

The rivet-holding belt is transferred between the flanges of the rivet-receiving flanges in the condition that the tubs face outwardly while being guided by the guide member, but as the guide member is shaped gradually large sized, the tubs of the rivet-holding belt also will gradually expand from the outer periphery of the rivet-receiving wheel, and the holding hole of the rivet-holding belt and the rivets and the like inserted in the rivet-receiving wheel are placed in the faced position, and accordingly the rivets and the like are pushed into the holding holes of the rivet-holding belt according to the expansion of the tubs, as the rivets and the like are rectified by the squeezing member.

Further, the invention cited in claim 2 is characterized by having an alternative rivet-aligning device against the invention cited in claim 1. Namely, the device is comprised with:

a hopper containing at random the rivets and the like to be supplied;

an aligning feeder installed in the hopper enabled to rise up and down through the bottom portion of the hopper;

an aligning slit installed in the aligning feeder for receiving the head portions of the rivets and the like and hanging the stem portions of the rivets and the like in line therein;

a surface inclined downwardly towards the position for delivering the vertically aligned rivets and the like to the rivet-receiving wheel;

a driving mechanism for raising and lowering the aligning feeder.

Further in this invention, the mechanism raising the aligning feeder uses a mechanism converting the rotational movement to the lifting up and down motion and the converting mechanism is connected to the driving shaft of the rivet-receiving wheel drive mechanism.

In this invention cited in claim 2, the rivets and the like to be supplied are thrown into the hopper. Next, the aligning feeder is raised to the upper limit position through the insides of the hopper by driving the lifting up and down mechanism. Herein, as the aligning feeder has an aligning slit for receiving the head portions of the rivets and the like and for hanging their stem portions therein, and enables to vertically align the rivets and the like in a series, it then becomes possible to pick up the rivets and the like by applying the aligning slit when the aligning feeder is raised. When the aligning slit picks up the rivets and the like, the head portions of the rivets are received on the upper surface of the aligning slit, and the stem portions of the rivets are vertically aligned in series in a hanging condition. Further, as the aligning feeder is shaped as an inclined surface able to transfer the rivets and the like aligned in series to the delivering position placed before the rivet-receiving wheel, it then becomes possible to supply the rivets and the like aligned vertically in the aligning slit to the delivering position to the rivet-receiving wheel accurately and efficiently.

In the invention recited in claim 3, the lifting mechanism of the aligning feeder, the converting mechanism converting the rotational motion to the up and down motion, and the converting mechanism are connected to the driving shaft driving the rivet-receiving wheel.

By applying this converting mechanism, it becomes possible to drive the rivet-receiving wheel and the rivet-aligning feeder with a single common driving shaft, and accordingly it further becomes possible to simplify the device as a whole and to miniaturize, and to take the work timing of the rivet-receiving wheel and the aligning and supplying device for the rivets and the like.

BRIEF DESCRIPTION OF THE DRAWINGS

FIG. 17 is a perspective view of the rivet wheel.

DETAILED DESCRIPTION OF THE INVENTION

With reference to the embodiment shown in the figures, the present invention is described in detail as follows.

Figure 2:
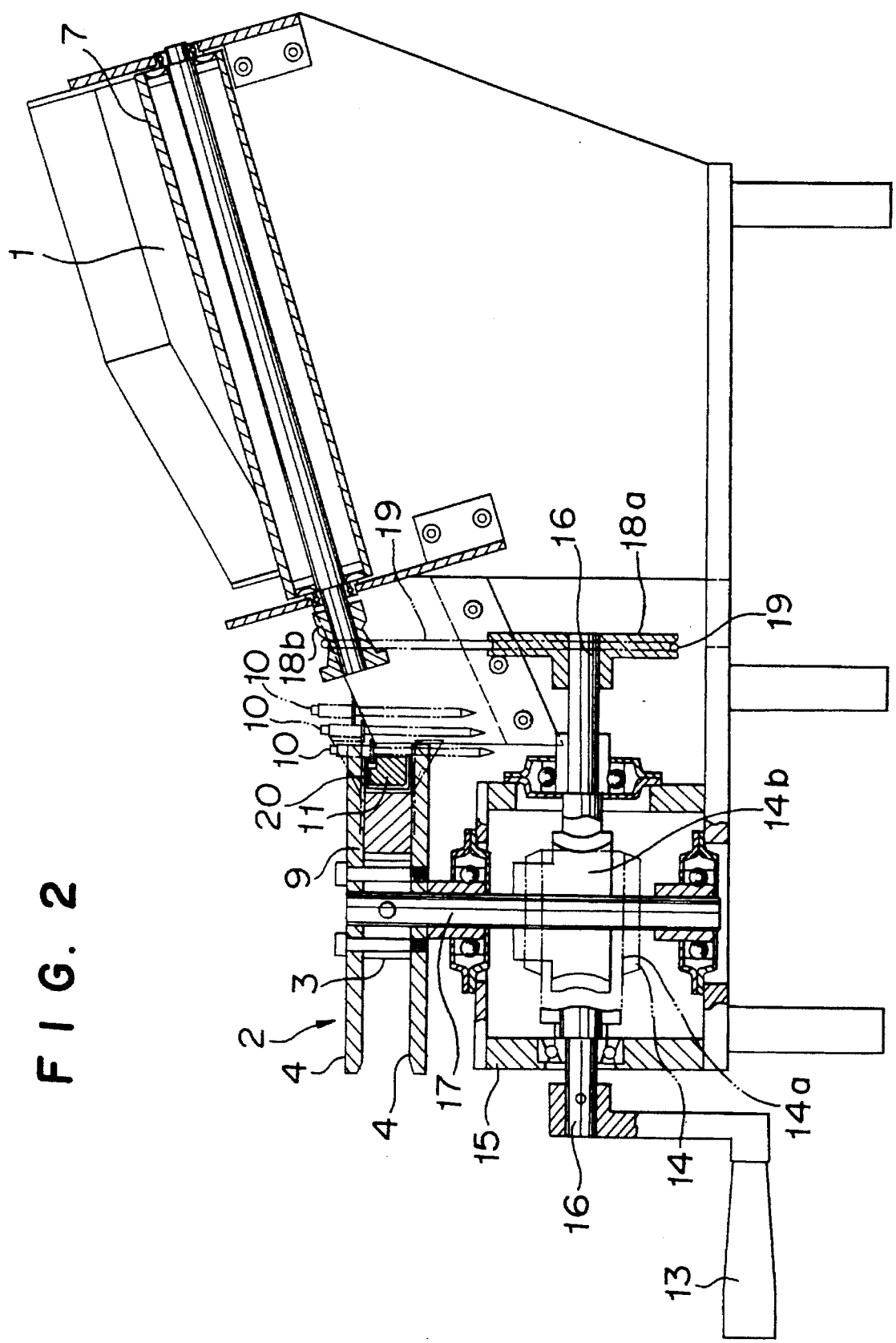
FIG. 2 is a vertical sectional view showing the first embodiment according to the present invention.
Figure 3:
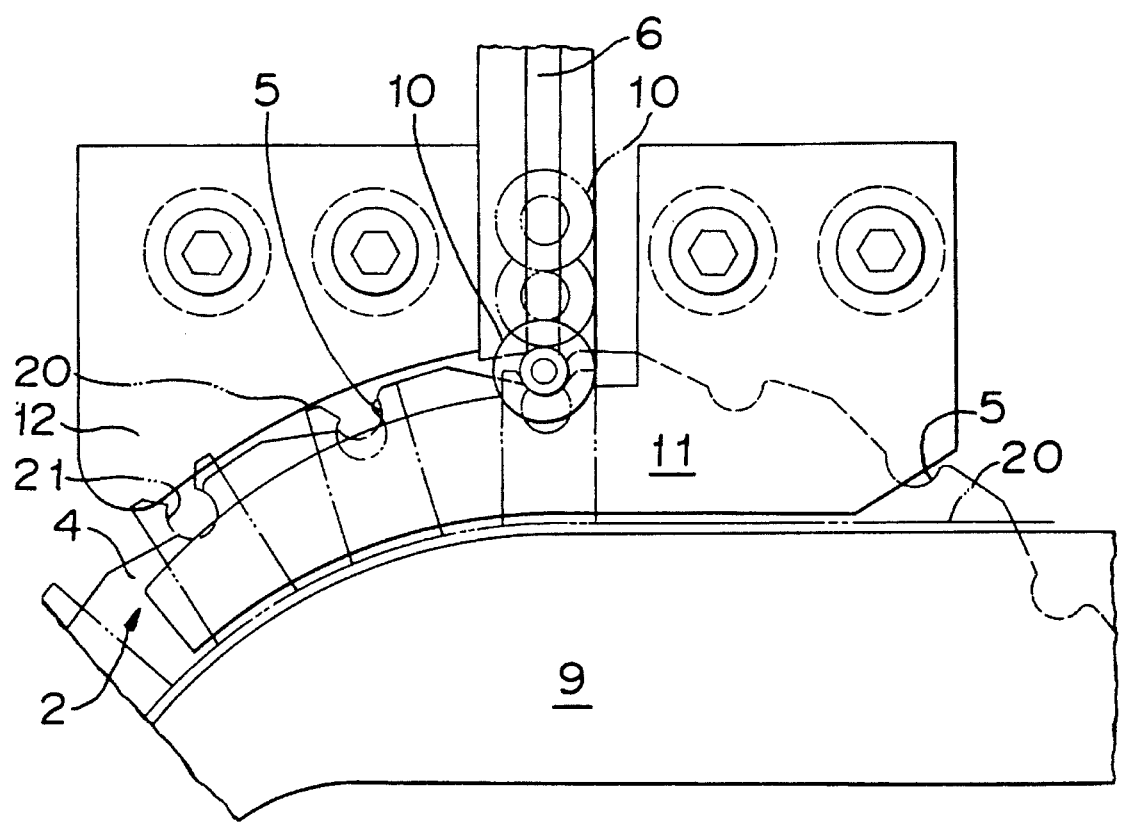
FIG. 3 is a plan view of the essential part showing the first embodiment according to the present invention.
Figure 4:
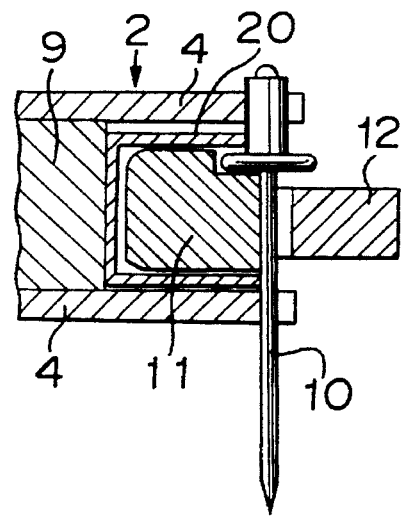
FIG. 4 is a sectional view of the essential part showing the first embodiment according to the present invention.
Figure 5:
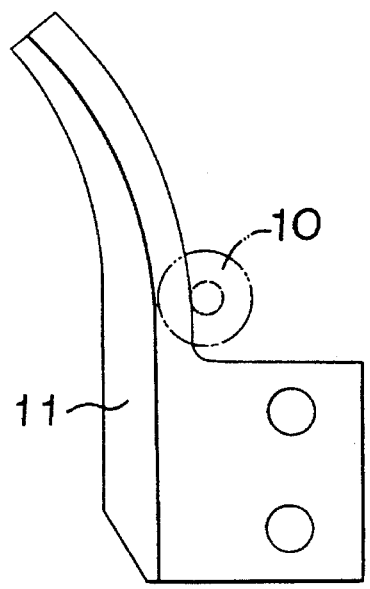
FIG. 5 is a plan view of the rectifying member.
Figure 6:
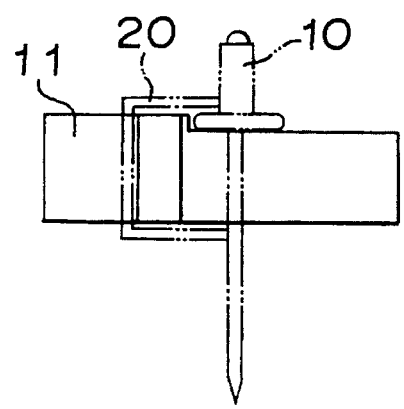
FIG. 6 is an elevational view of the rectifying member.
Figure 7:
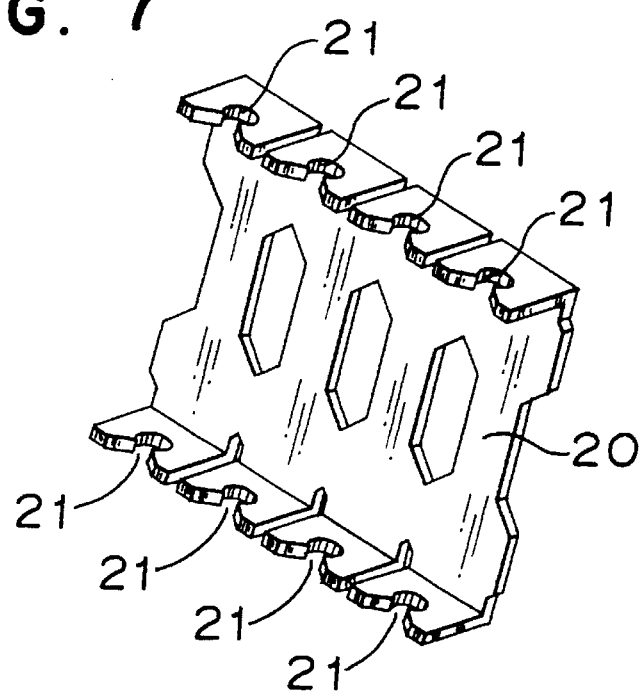
FIG. 7 is a perspective view showing the portion of a blind rivet-holding belt.
Figure 8:
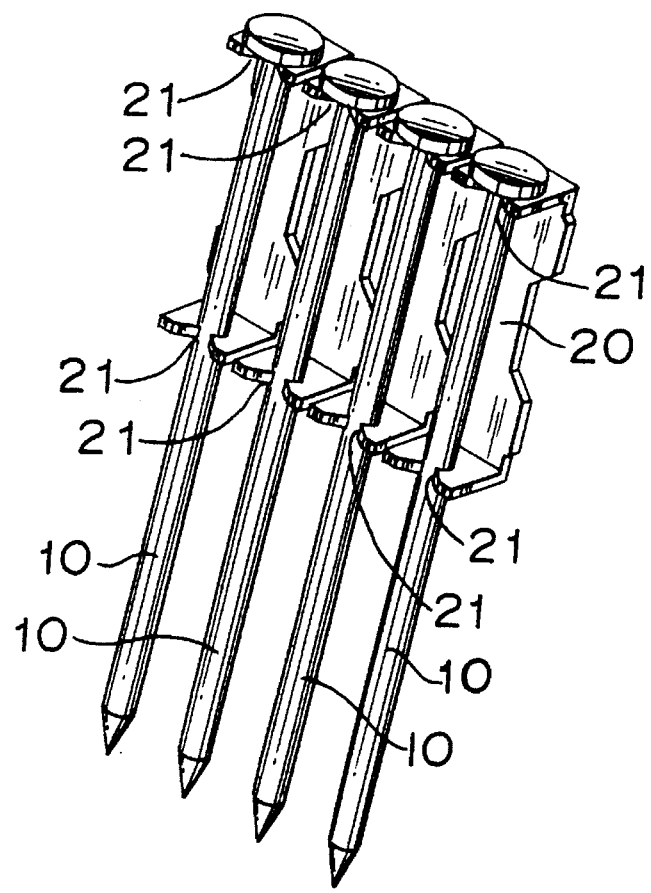
FIG. 8 is a perspective view showing the blind rivets inserted in rivet-holding holes of the blind rivet-holding belt.

FIG. 1 to FIG. 8 show the first embodiment according to the present invention;

FIG. 2 is its sectioned elevational plan view;

FIG. 3 is a plan view showing essential parts of the embodiment;

FIG. 4 is a sectional view showing essential parts of the embodiment;

FIG. 5 is a plan view showing the rectifying member;

FIG. 6 is an elevational view showing the rectifying member;

FIG. 7 is a partial perspective view of a holding belt for a rivet and the like; and FIG. 8 is a perspective view showing the blind rivets inserted in holding holes provided in the rivet-holding belt. This figure shows the blind rivet as the representative example of a rivet and the like.

In these figures, the device according to the present invention is comprised with:

- a hopper 1 containing blind rivets as the representative example of a rivet and the like;
- a feeding route for transporting the blind rivet; a revolving roller 7 letting the blind rivet fall in the feeding route;
- a rivet-receiving wheel 2;
- a guide member 9 guiding a rivet-holding belt;
- a rectifying member 11 for rectifying the blind rivet 10;
- a squeezing member 12 for pushing the blind rivet 10; and
- a driving device for driving the rivet-receiving wheel 2 and the revolving roller 7.

The above-mentioned hopper 1 is opened upwardly, and the blind rivets 10 are thrown in the hopper through this opening. The bottom surface 1b of the hopper 1 is inclined towards the exit 1a, and then it is natural to let the blind rivets flow out towards the exit 1a.

The revolving roller 7 is placed between the exit 1a of the hopper 1 and the feeding route 6. A groove 8 is shaped on the external periphery of the roller 7 along the axial direction. Accordingly, accompanying the revolution of the revolving roller 7, the groove 8 picks up the head of the blind rivet 10 flown out to the exit 10 of the hopper 1 and slightly raises up the rivet 10, then lets the rivet 10 fall down into the feeding route 6 from the tip of the stem portion of the blind rivet.

The feeding route 6 is shaped as a slit having a breadth larger than the diameter of the stem and smaller than the diameter of the head of the blind rivet 10. This feeding route 6 is installed between the exit la of the hopper 1 and the transferring position transferring the blind rivet 10 to the rivet-receiving wheel 2, and is shaped to be downwardly inclined towards the rivet-receiving wheel 2. This feeding route 6 is composed so as to receive the head portion of the blind rivet 10 fallen down by the revolving roller 7, and aligns the rivet 10 in the state that the stem portion of the rivet 10 hangs down, and supplies the rivet 10 into the rivet-receiving wheel 2 by applying gravity.

The rivet-receiving wheel 2 is composed with a spacer 3 shaped to have a height slightly higher than that of the rivet-holding belt 20, a pair of flanges 4, 4 installed on the upper portion and the lower portion of the spacer 3. Each of the flanges 4 is provided circumferentially with a plural of grooves 5 in accordance with the pitch of the holding hole 20 of the rivet-holding belt 20, and each fixed to the spacer 3 so as to be aligned to the phase of the grooves 5 and 5. The rivet-holding belt 20 is movably inserted between each of the flanges towards the direction shown by arrow b in FIG. 1 in the state that holding holes 21 are face the exterior. The blind rivet 10 is about vertically fed one by one in the pair of grooves 5 and 5 located on each of upper and lower flanges 4 and 4, then each pair of grooves 5 and 5 receives the blind rivet 10, and accordingly the rivet 10 becomes aligned to the pitch of the holding hole 21 of the rivet-holding belt 20.

The guide member 9 is distributed from the vicinity of the position that the rivet-receiving wheel 2 receives the blind rivet 10 to the position that the blind rivet 10 is transferred to the rivet-holding belt 20. This guide member 9 is constructed so as to push out the rivet-holding belt 20 from the position come to the radial inner side of the flange 4 towards the position inserting the blind rivet 10 into the rivet-holding belt 20 as shown in FIG. 3.

The rectifying member 11 is installed near the receiving side of the rivet-receiving wheel 2 for receiving the blind rivet 10, and the tip portion is inserted between a pair of flanges 4 and 4. This member 11 holds the head portion of the blind rivet 10 inserted in each of the grooves 5 and 5 shaped on each of the flanges 4 and 4, and puts the vertical position of each of blind rivets 10 in order as shown in FIG. 4, FIG. 5 and FIG. 6.

The squeezing member 12 is installed in a position receiving the blind rivet 10 in each of receiving holes 21 of the rivet-holding belt 20. This squeezing member 12 is constructed so as to push the blind rivet 10 aligned in specified pitch by the rivet-receiving wheel 2 and sent after the vertical position was put in order by the rectifying member 11, into the holding holes 21 of the rivet-holding belt 20 which is pushed out to the squeezing position by the guide member 9, as shown in FIG. 3.

The driving device is composed with a handle 13, a driving shaft 16 supported horizontally and rotatably in a gear box 15 and connected to the handle 13, a driven shaft 17 placed in rectangular direction against the driving shaft 16, and rotatably supported in the gear box 15 and further provided with the rivet-receiving wheel 2 at the upper end, and a power-transmitting mechanism 14 comprising a worm 14a mounted on the drive shaft 16, and a worm wheel 14b mounted on the driven shaft 17. A driving pulley 18a is installed on another end of the driving shaft 16, opposed to the handle 13, and a driven pulley 18b is installed on the shaft of the revolving roller 7. A rope 19 is wound between the driving pulley 18a and the driven pulley 18b as a wound power transmitting member. Accordingly, in this driving device, it is possible to rotate the rivet-receiving wheel 2 through the driving shaft 16, power-transmitting mechanism 14 and the driven shaft 17, by rotatably driving the handle 13, and to rotate the revolving roller 7 through the driving shaft 16, the driving pulley 18a, the rope 19 and the driven pulley 18b.

Figure 1:
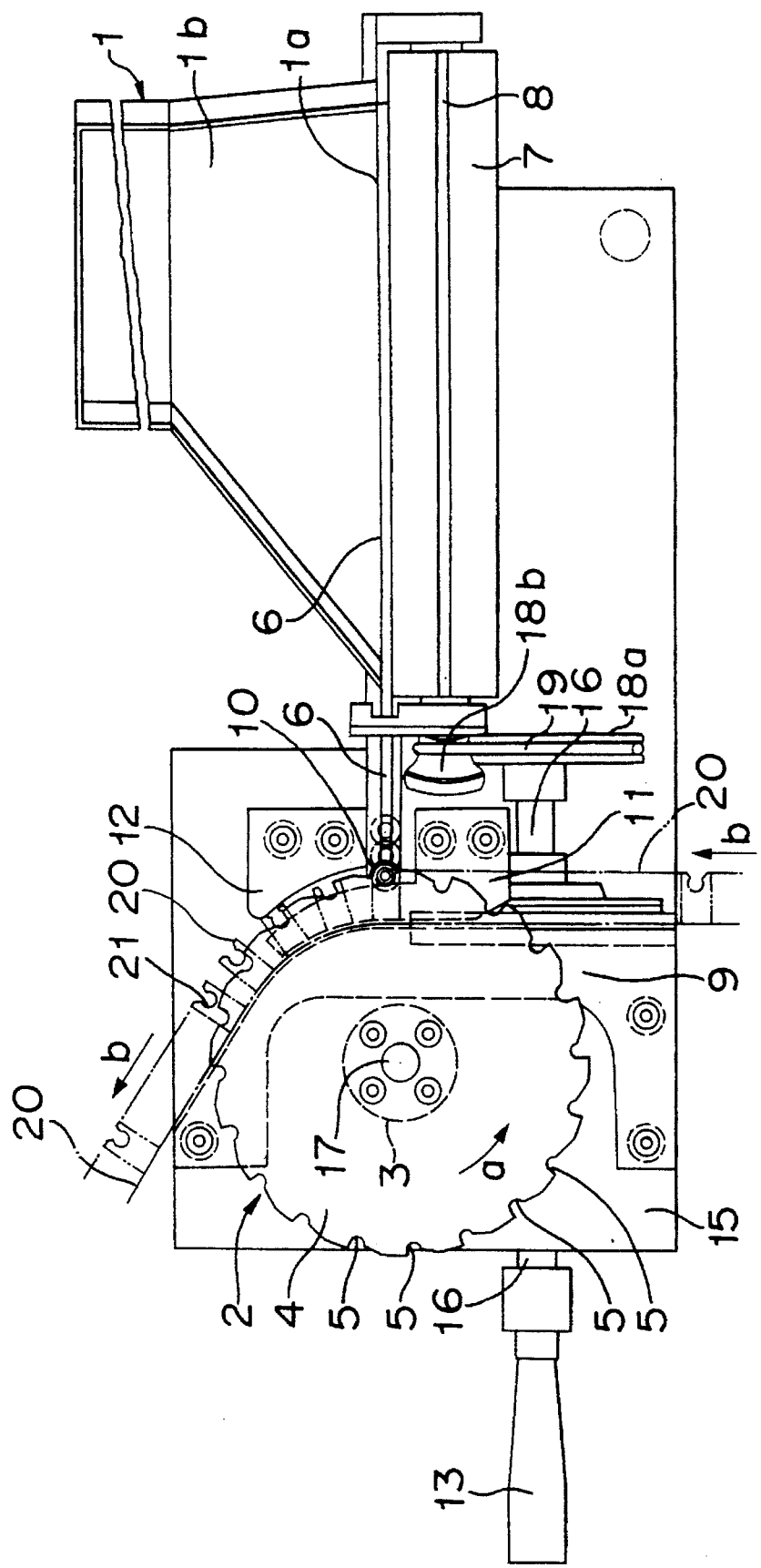
FIG. 1 is a plan view showing the first embodiment according to the present invention.
Figure 9:
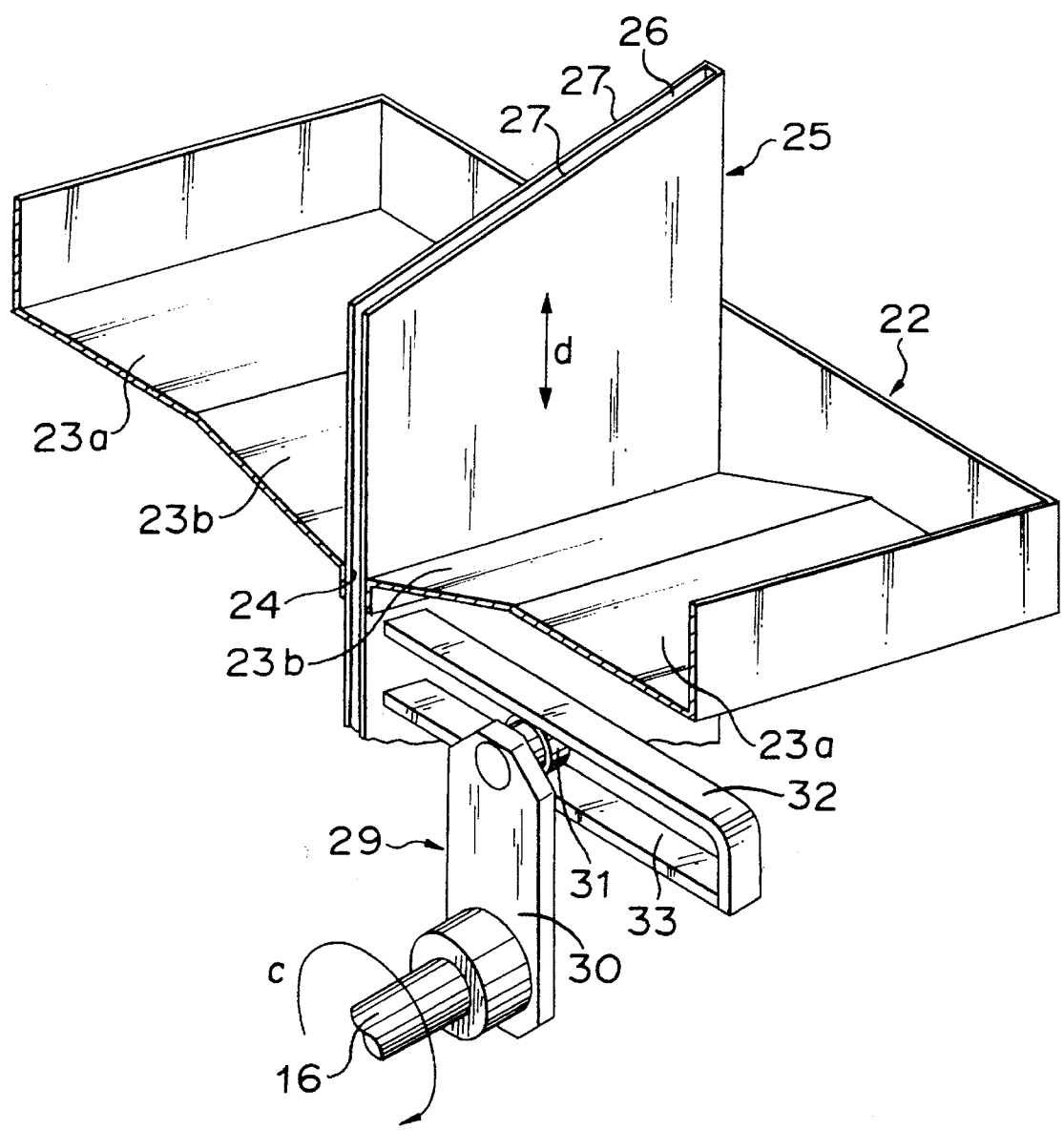
FIG. 9 shows the second embodiment according to the present invention, and is a perspective view of the sectional essential part.

Accordingly, in applying this device, the blind rivets 10 are thrown into the hopper 1, and the handle 13 of the driving device is rotatably driven. By this operation, the rivet-receiving wheel 2 begins to rotate towards the direction indicated by arrow a as shown in FIG. 1 together with the revolving roller 7. On the other hand, the rivet-holding belt 20 shown in FIG. 9 is introduced between the flanges 4 and 4 of the rivet-receiving wheel 2 in the posture that the holding hole 21 faces outward, namely, faces the feeding route 6, and is driven towards the direction indicated by arrow b as shown in FIG. 1 by hand or by a feed device (not shown).

In such a condition, as the bottom surface 1b of the hopper 1 is downwardly inclined towards the exit 1a, the blind rivets 10 in the hopper 1 naturally flow down toward the exit 1a.

The revolving roller 7 provided with the groove 8 along the axial direction is installed between the exit 1a and the feeding route 6, and in company with the rotation of the roller 7, the head of the blind rivet 10 is hung by the groove 8 and slightly raised, and then the blind rivet 10 is dropped into the feeding route 6 in the posture that the head of the rivet 10 is upwardly placed.

As the feeding route is shaped as a slit having a width larger than the stem portion and smaller than the head portion of the blind rivet 10, the blind rivets 10 dropped into the feeding route 6 are received on the upper surface of the route 6 by applying the head portions and are aligned hanging in the route 6. Further, as the feeding route 6 is shaped to be downwardly inclined towards the rivet-receiving wheel 2, it is possible to supply blind rivets 10 aligned in the feeding route 6 to the delivering position between the wheel 2 by applying gravitational force.

In the delivering position, the blind rivet 10 is inserted one by one in the grooves 5, 5 provided on the flanges 4 and 4 of the rivet-receiving wheel 2. In this delivering position, as the head of the blind rivet 10 is received by the rectifying member 11, then the vertical positions of the blind rivets 10 are set on the same level. Further, in accordance with the rotation of the rivet-receiving wheel 2, the blind rivet 10 is forced to move towards the holding holes 21 on the rivet-holding belt 20.

The guide member 9 is stretched from the delivering position to the inserting position of the blind rivet 10, and the rivet-holding belt 20 is gradually pushed toward the exterior side from the radial inside of the rivet-receiving wheel 2 by applying the guide member 9. While the rivet-holding belt 20 reaches the inserting position, the belt 20 receives the blind rivet 10 in the position of the holding holes 21 one by one, and successively moves to the above-mentioned inserting position.

The squeezing member 12 is placed on the blind rivet inserting position, then the blind rivet 10 is pushed into the holding holes 21 of the rivet-holding belt 20 and inserted into the holding holes 21 of the rivet-holding belt 20, and further sent toward the direction indicated by arrow b as shown in FIG. 1.

By repeating the above-mentioned operations, as the blind rivets 10 are sequentially inserted in holding holes 21 of the rivet-holding belt 20, it then becomes possible to obtain the rivet-holding belt 20 in which the blind rivets 10 are inserted in the holding holes 21 of the rivet-holding belt 20 as shown in FIG. 8.

Furthermore, it is needless to say that the present invention enables insertion of not only blind rivets, but also nails and small thread screws in the corresponding holding belt.

Figure 15:
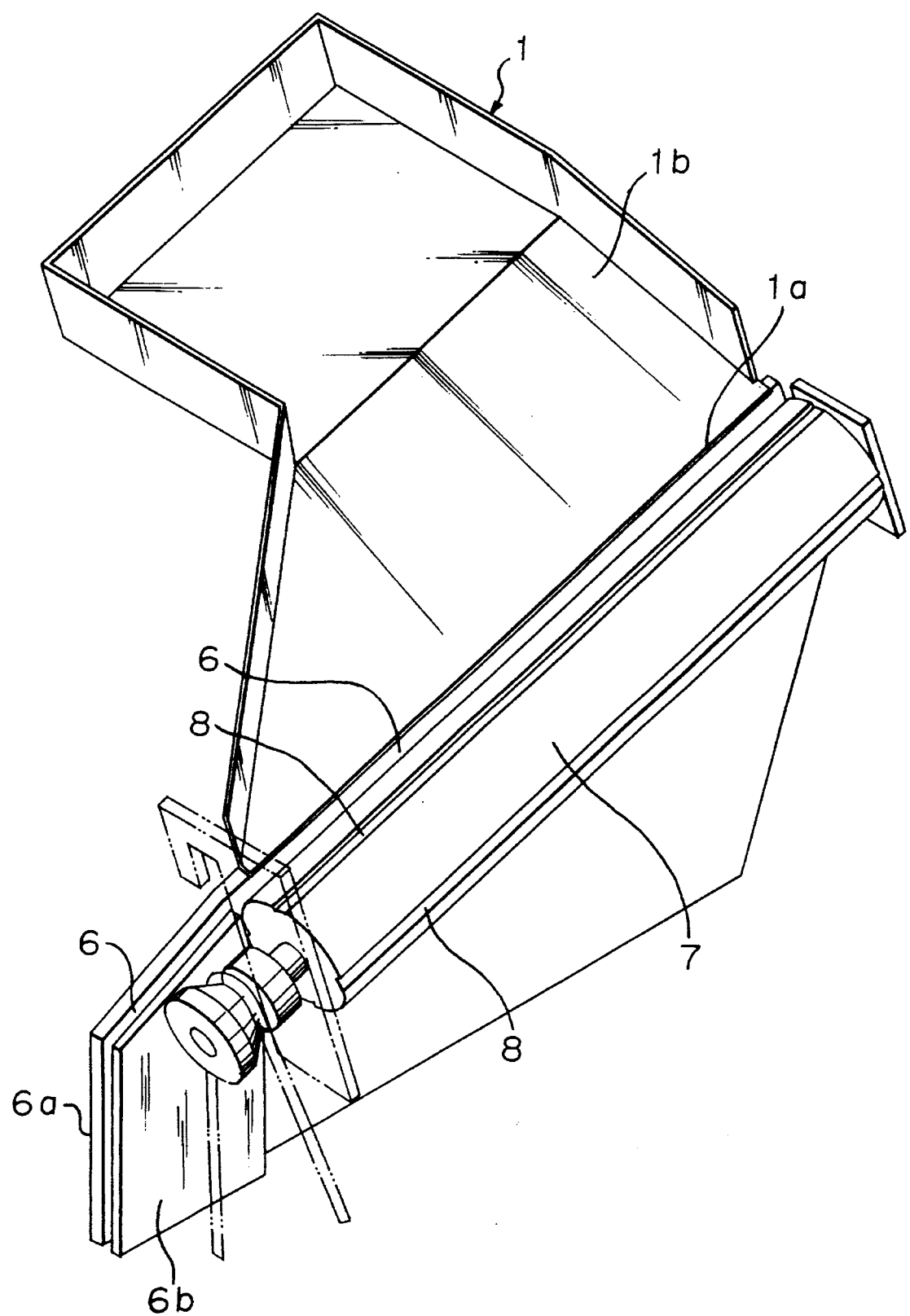
FIGS. 15 and 16 are prespective and sectional views, respectively, of the hopper shown in the first embodiment of the present invention.
Figure 16:
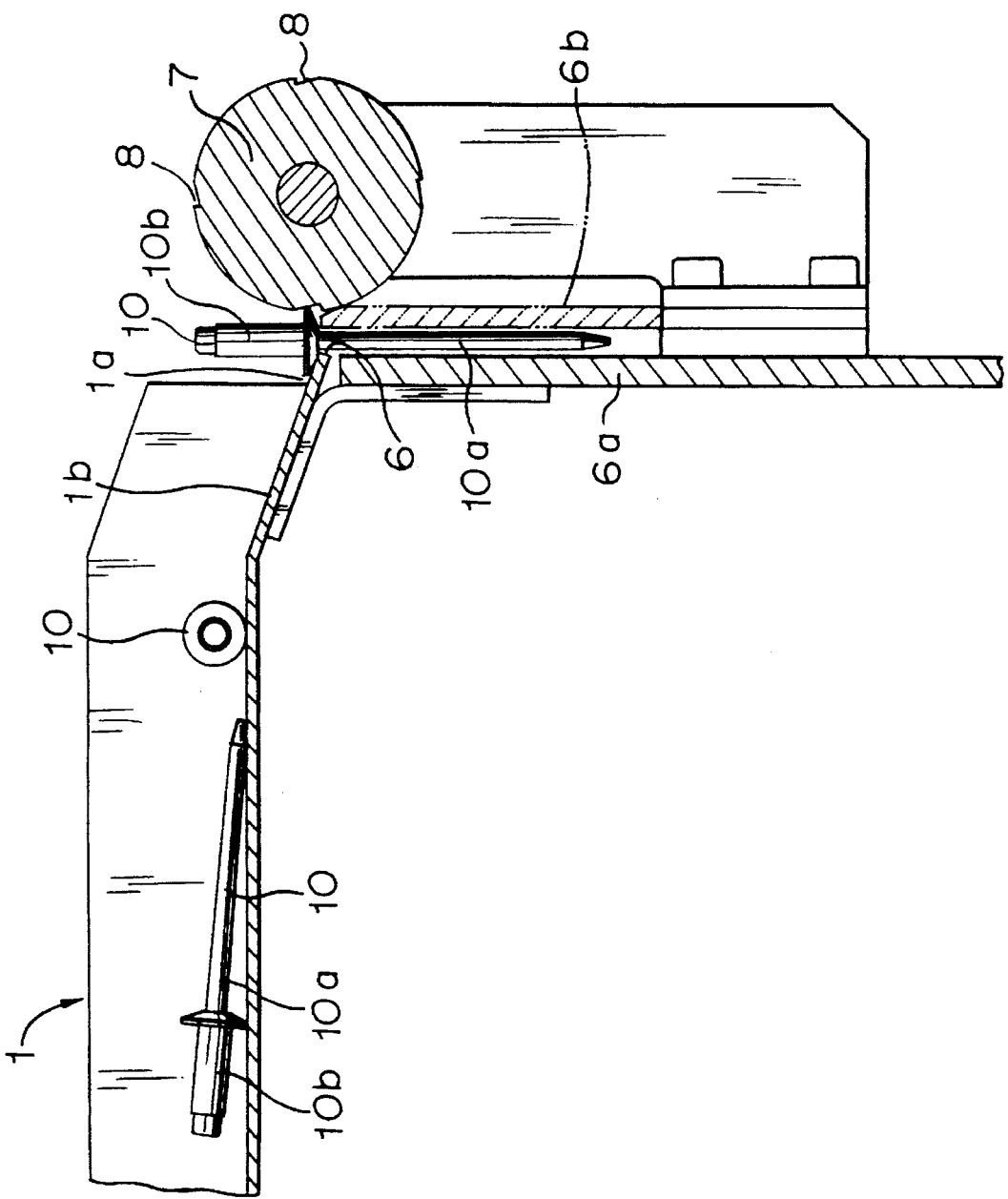

With further reference to the first embodiment of the present invention, and to FIGS. 15–17 in particular, the hopper 1 is upwardly opened, and the blind rivets, nails or screws are thrown into this hopper from the upwardly facing opening. As best shown in FIG. 16, the bottom surface 1b of the hopper 1 is downwardly inclined towards the exit 1a, and thus the blind rivet 10 flows down by itself without any assistance. At the exit 1a of hopper 1, there is provided a feeding route 6, where the blind rivet 10 comes to slowly or gradually.

As the feeding route 6 is shaped with a slit provided between plates 6a and 6b as best shown in FIGS. 16–17, the slit is further shaped with a breadth larger than the diameter of the stem portion 10a of the blind rivet 10, but smaller than the diameter of the head portion 10b. It will be appreciated that the blind rivet 10 is not necessarily inserted into the feeding route 6, even if following down from the hopper 1 towards the feeding route 6. Accordingly, as a revolving roller 7 is provided along the route, the blind rivet 10 is picked up by groove 8 of the revolving roller 7 and finally inserted into the feeding groove 6, by rotation of the revolving roller 7. In addition, as the blind rivet 10 is comprised of a stem portion 10a and a head portion 10b as shown in the figures, then the stem portion 10a is dropped into the feeding route 6, and inserted into feeding route 6, while being vertically aligned to the feeding route 6. Moreover, as the feeding route 6 is provided between the exit 1a of the hopper 1 and a transfer position of the blind rivet 10 facing the rivet wheel 2, and is downwardly inclined towards the rivet wheel 2, then the blind rivet 10 is inserted into the feeding route 6 will be supplied into the rivet wheel 2 by its own weight.

The second embodiment according to the present invention is next described with reference to FIG. 9 to FIG. 14, and the same materials as in the first embodiment are given the same reference numerals, and duplicate explanations are omitted.

Figure 10:
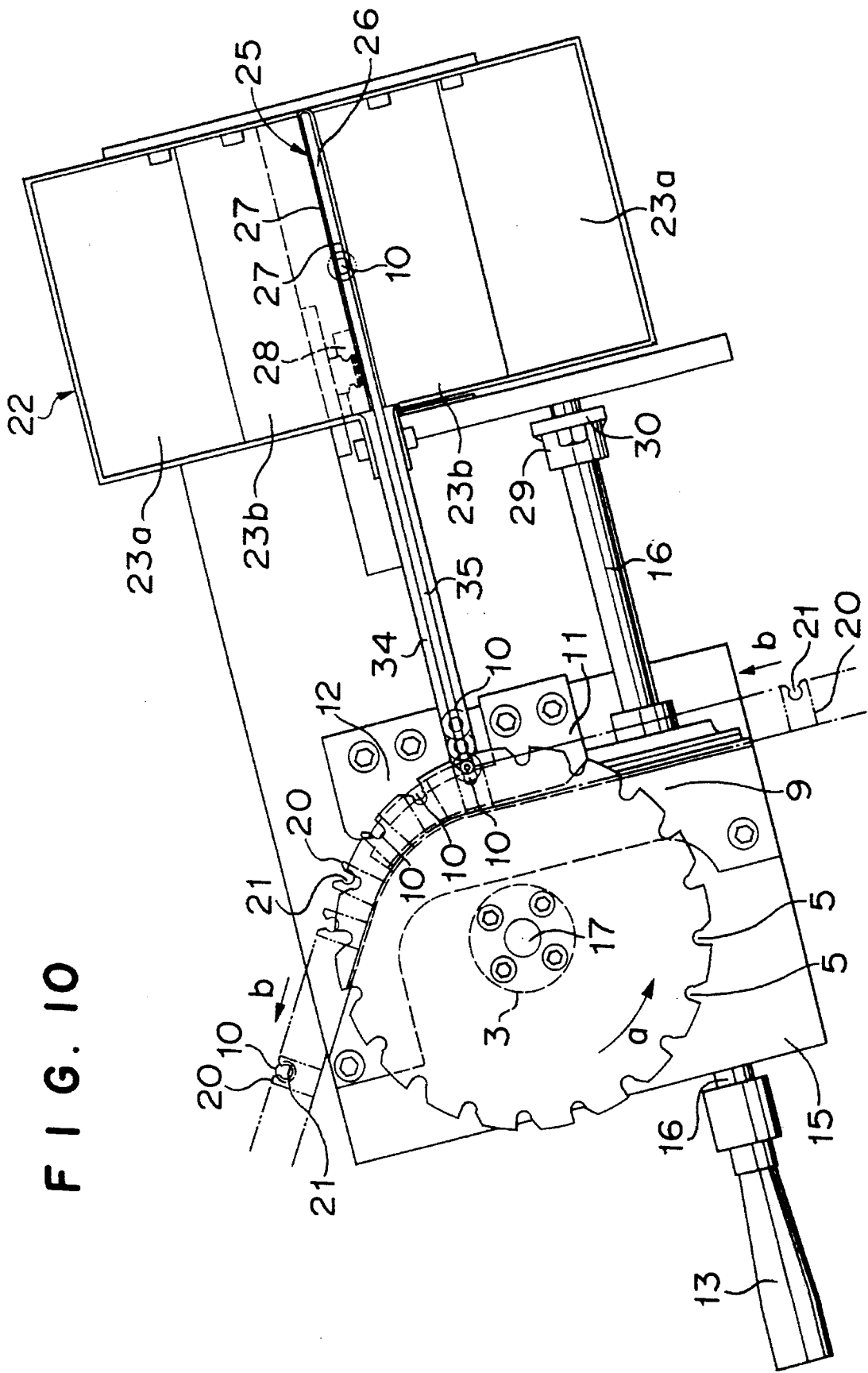
FIG. 10 is a plan view showing relational arrangement of the rivet-aligning device and rivet-inserting device shown in FIG. 10.
Figure 11:
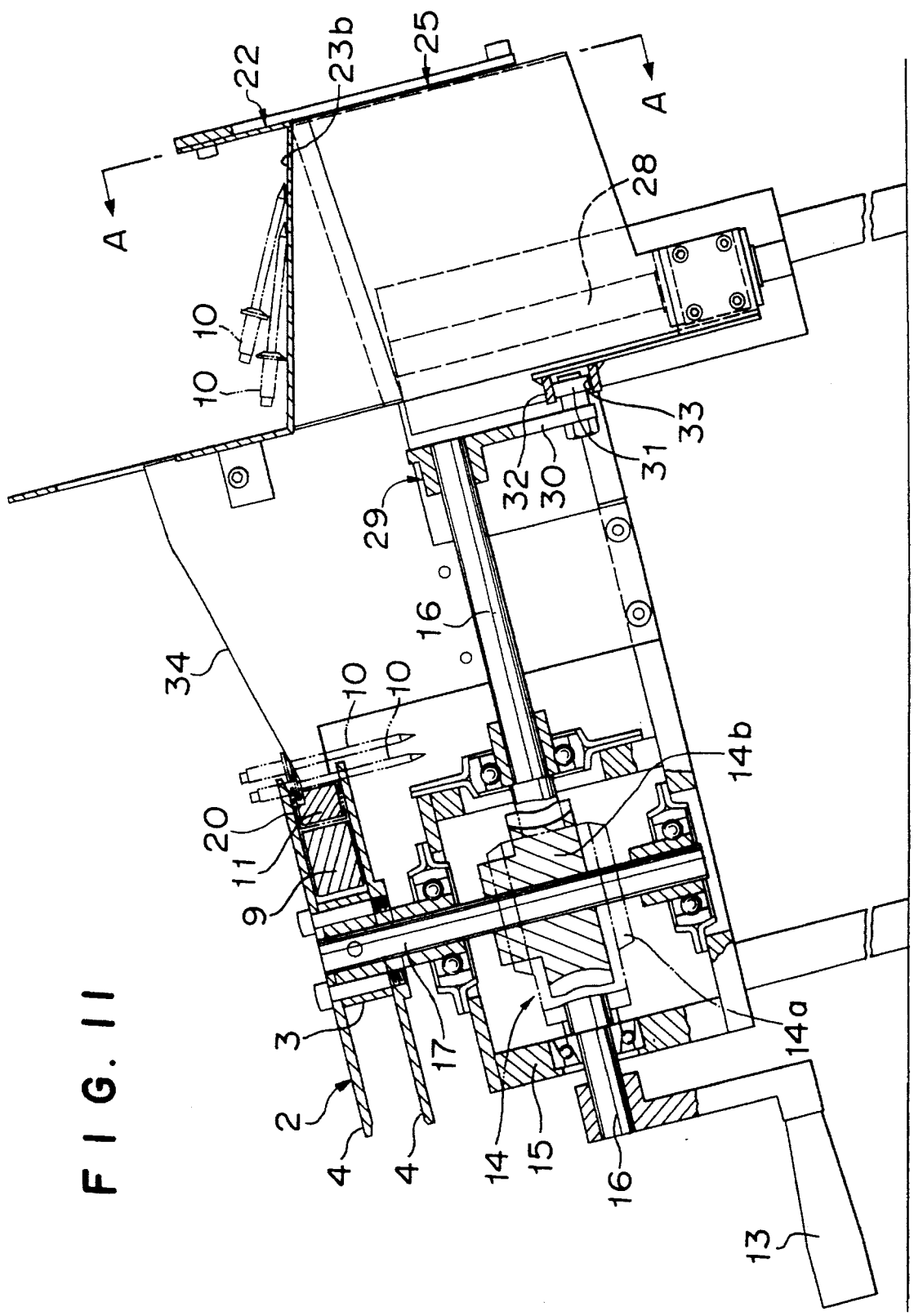
FIG. 11 is a sectional elevational view showing the aligning feeder descended.
Figure 12:
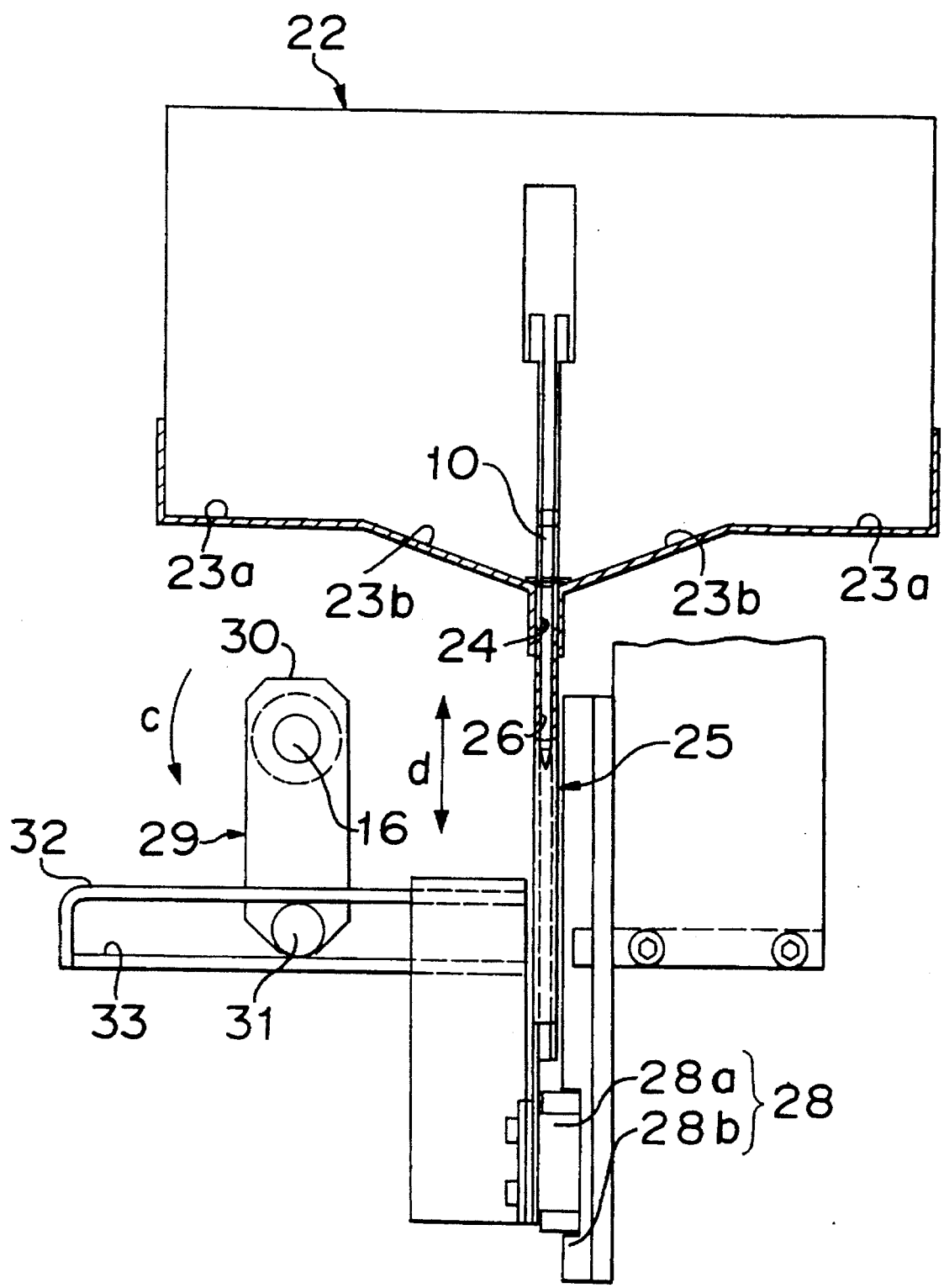
FIG. 12 is a sectional elevational view along line A—A of FIG. 11.
Figure 13:
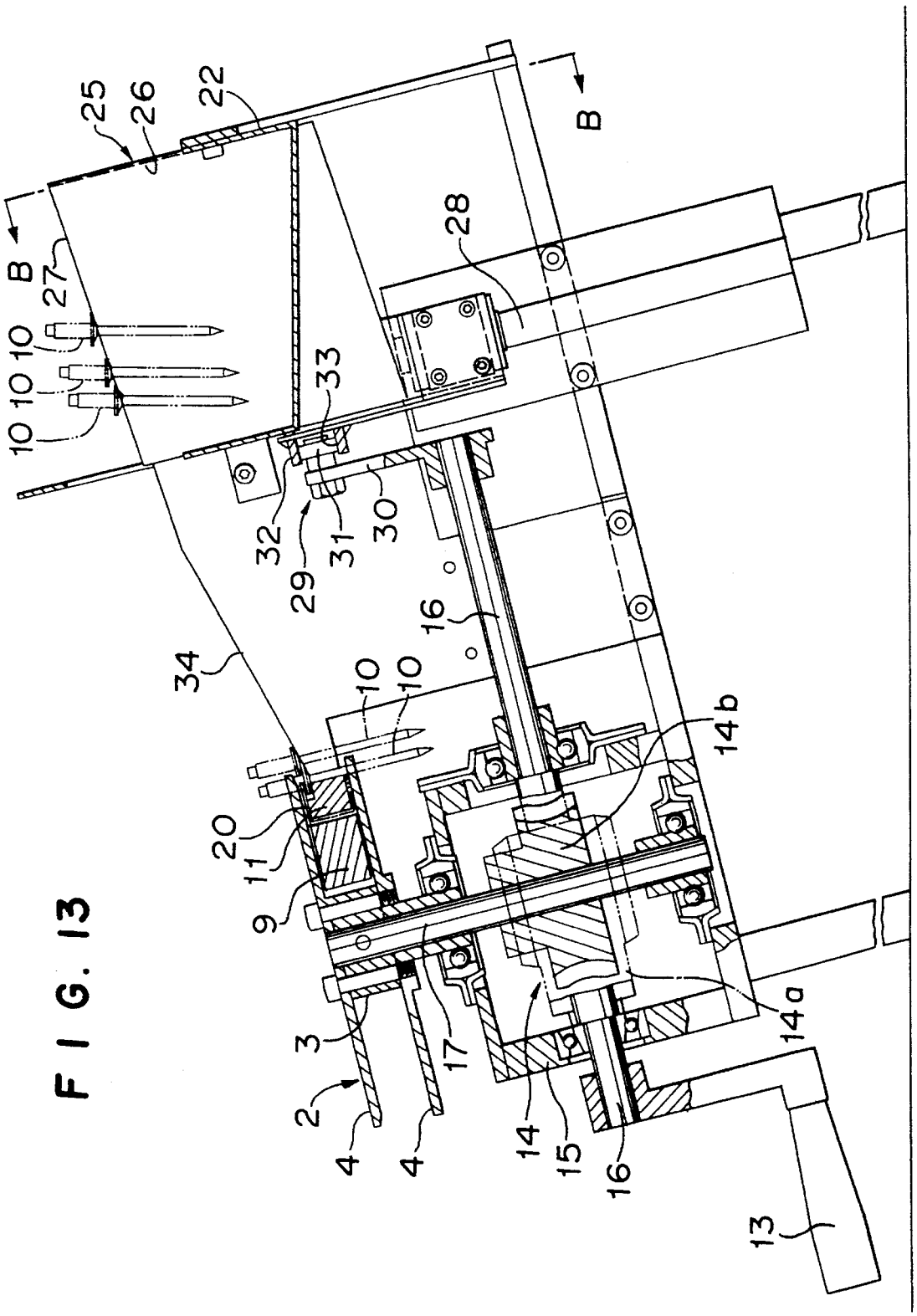
FIG. 13 is a sectioned elevational view showing the aligning feeder ascended.

In the drawings showing the second embodiment according to the present invention:

FIG. 9 is a perspective view showing the essential parts of the embodiment;

FIG. 10 is a plan view showing the relational arrangement referring to a rivet aligning, supplying device and a rivet-inserting device;

FIG. 11 is an elevational view showing the aligning feeder descended;

FIG. 12 is a sectional view along line A—A in FIG. 11;

FIG. 13 is an elevational view showing the aligning feeder ascended; and

Figure 14:
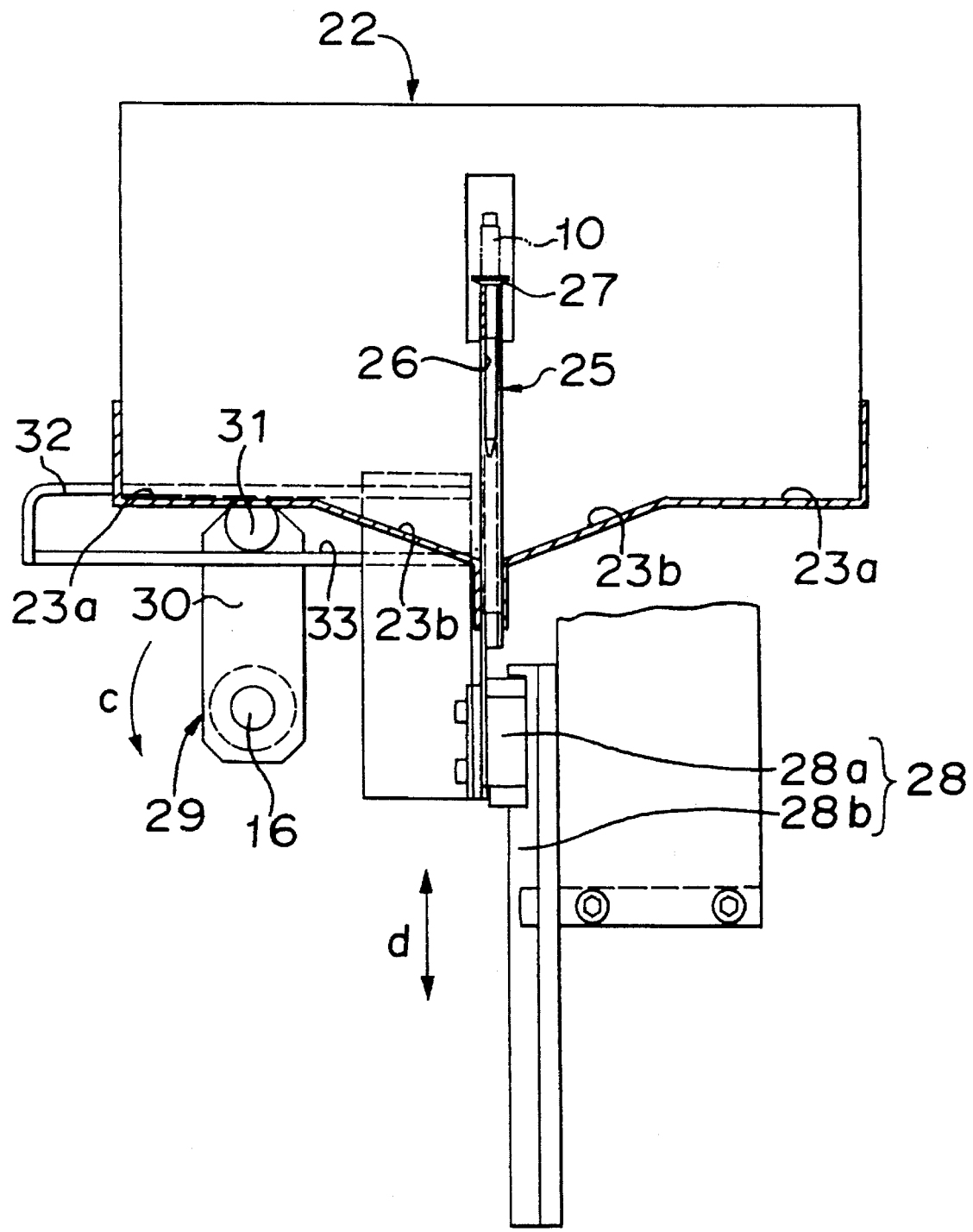
FIG. 14 is a sectioned elevational view along line B—B of FIG. 13.

FIG. 14 is a sectional view along line B—B in FIG. 13.

In the embodiment shown in these drawings, an aligning and supplying device of rivets or the like is comprised with a hopper 22, an aligning feeder 25 and a lifting mechanism 29 for ascending/descending the aligning feeder 25. Further in this embodiment, a chute 34 for carrying the blind rivets is provided between the aligning feeder 25 and the rivet-receiving wheel 2.

The hopper 22 is shaped as a box opened upwardly. As the bottom plates of the hopper 22 positioned in each of breadthwise outer portions are shaped as flat surfaces 23a, the central portions are shaped as downwardly inclined surfaces 23b, as shown in FIG. 9 and FIG. 12 to FIG. 14, it then becomes possible to collect the blind rivets thrown in the hopper 22 towards the central inclined portion. Further, a slit 24 for lifting the aligning feeder is provided on the center portion of the hopper bottom plates.

As shown in FIG. 9, in looking downwardly the aligning feeder 25 is shaped to build up slender U type, and has an aligning slit 26 for receiving the blind rivet 10. This aligning slit is shaped with a breadth wider than the stem portion of the corresponded rivet and the other and narrower than the head portion, and the head portion is supported on the upper surface of the aligning slit 26 and the stem portion of the rivet and the like is vertically hung in the aligning slit 26 and aligned with each other.

Further, as an upper surface of the aligning feeder 25 is shaped as an inclined surface 27 slanting downwardly towards the delivering position between the rivet receiving wheel 2, it is then possible to slide down naturally the aligned rivets and the like by gravity.

As further shown in FIG. 10 to FIG. 14, the aligning feeder 25 is so guided by guide member 28 comprising members 28a and 28b as to be able to move vertically in a straight line.

The driving mechanism 29 for ascending or descending the aligning feeder 25 is provided with a crank mechanism working as a converting mechanism converting the rotational movement to the linear up-down motion. The crank mechanism is comprised with a crank arm 30 installed on the driving shaft 16 and provided with a roller follower 31 on another end of the arm 30, and a driven arm 32 having a long horizontal guide groove 33 and installed on one side of the lower end portion of the aligning feeder 25. Further, the roller follower 31 is movably installed in the guide groove 33. The driving shaft 16 is common with the shaft for driving the rivet-receiving wheel 2. In the crank mechanism, when the drive shaft 16 is driven to rotate toward the direction indicated with an arrow c as shown in FIG. 9, the crank arm 30 also rotates towards the same direction, then the roller follower 31 pushes up or pulls down the driven arm 32 while the follower 31 is moving along the guide groove 33, accordingly, the aligning feeder 25 is moved up and down towards the direction indicated by arrow d as shown in FIG. 9.

In the shoot 34, a slit 35 having the same shape as the aligning slit 26 is installed in the aligning feeder 25. When the aligning feeder 25 is raised up close to the upper limit, the slit 35 is connected to the aligning slit 26, and receives the rivet and the like from the aligning slit 26, and then feeds the rivet and the like to the delivering portion connected to the rivet receiving wheel 2 in the same pose as that received.

However, as the construction of other parts in this embodiment are the same as those shown in FIG. 1 to FIG. 8, the same members are identified with the same reference numerals, and further descriptions are eliminated.

The action of the rivet aligning and supplying device according to the second embodiment is described as follows.

At first, in an initial condition the aligning feeder 25 is placed at the bottom limiting position. In this condition, as an example of the corresponding rivets or the like, the blind rivets 10 are thrown in the hopper 22 at random.

As mentioned above, when throwing the blind rivets 10 into the hopper 22, the rivets 10 are naturally collected in the center portion in the hopper, as the center portion of the bottom plates of the hopper 22 are shaped in an inclined surface 23.

By driving the driving shaft 16, the crank arm 30 of the crank mechanism 29 begins to rotate towards the same rotating direction of the driving shaft 16, and at the same time as the roller follower 31 installed on the tip portion of the crank arm 30 moves along the guide groove 33 of the driven arm 32, the arm 32 is raised up. Accordingly, the aligning feeder 25 is raised up in the interior of the hopper 22 from the bottom position through the slit 24 shaped on the bottom plate of the hopper 22.

As described above, when the aligning feeder 25 is raised in the hopper 22, the blind rivets 10 collected in the center portion of the hopper 22 are dipped up by the aligning slit 26. The blind rivets 10 dipped up by the aligning slit 26 are received on the upper surface of the aligning slit 26 at the head portions of the rivets, and the step portions of the rivet 10 are vertically hanged in the aligning slit 26, while the aligning feeder 25 is raised up, as the width of the aligning slit 26 is shaped smaller than the diameter of the head portion of the blind rivet, and larger than the diameter of the stem portion of the blind rivet. Namely, the blind rivets are connected with each other on the upper surface of the aligning feeder 25 and are aligned to be held in that condition.

Next, when the aligning feeder 25 is raised up to the upper limit, the blind rivets 10 aligned on the aligning feeder 25 begin to slide along the inclined surface 27, successively transfer to the slit of the chute 34 almost as it is, because the upper surface of the aligning feeder 25 is shaped in an inclined surface 27.

Then the blind rivets transferred to the chute 34 are next delivered to the delivering position against the rivet-receiving wheel 2.

While the above actions proceed, in company with the progressing revolution of the crank arm 30, the aligning feeder 25 returns to the lowest limited position, as the driven arm 32 is driven downwardly through the roller follower 31 and the guide groove 33.

In applying this embodiment, by repeating the above actions, it becomes possible to align the blind rivets 10 thrown in the hopper 22 at random in vertical postures, and to deliver them accurately and efficiently to the delivering position against the rivet-receiving wheel 2.

Furthermore, in applying this embodiment, because the rotational movement of the rivet-receiving wheel 2 and the lifting movement of the aligning feeder 25 are operated with the common driving shaft 16 of the driving device, it becomes possible to realize simplification and miniaturization of the device as a whole, and to match the working times between the rivet-receiving wheel 2 and the aligning, supplying device.

Also, it may be possible to lift up and down the aligning feeder 25 by applying independent driving mechanism, and when applying a common driving shaft 16 for the rivet-receiving wheel 2, it may be possible to apply a mechanism converting the different revolving motion with the crank mechanism to the lifting motion.

Also, this invention is applicable not only to blind rivets 10, but also generally to rivets and the like having larger head portions than stem portions, and heavier stem portions than head portions.

As described in detail above, by applying the invention cited in the first claim, it becomes possible to automatically insert blind rivets into the rivet-holding belt by simple operation, and to obtain the rivet-holding belt successively inserting the blind rivets with ease. Furthermore, as the rivet-inserting device is small-sized and simply constructed, it becomes possible to provide the device at a low price.

Further, by applying the invention cited in the second claim, it becomes possible to successively align the rivets and the like in vertical postures and accurately and efficiently supply them to the delivering position placed before the rivet-receiving wheel, because the device is provided with a hopper containing at random the rivets and the like to be supplied, and an aligning feeder enabling itself to rise up or down through the inner side of the hopper, and an aligning slit enabled to receive the head portions of the rivets and the like and to hang the stem portions of them in series, and to hold them in vertical postures, and an inclined surface enabled to slide them towards the delivering position placed before the rivet-receiving wheel, and further a driving mechanism connected to the aligning feeder.

By applying the invention cited in the third claim, it becomes possible to drive the rivet-receiving wheel and the aligning feeder with a single driving shaft, and accordingly to compactize and miniaturize the device as a whole, and to match the operating timing between the rivet-receiving wheel and the rivet-aligning and supplying device.

What is claimed is:

1. A rivet-inserting device for inserting multiples of rivets each having a head of one diameter and a stem of another smaller diameter into a rivet-holding belt having an aligning device for vertically aligning said rivets in series, and an inserting device for continuously inserting said rivets received in a rivet-receiving wheel into a rivet-holding belt, and a driving device for driving said aligning device and said rivet-inserting device, and said aligning device further comprises:

a hopper containing said rivets;

a rivet-feeding route installed between said hopper and said rivet-receiving wheel, shaped in a slit having a width larger than the diameter of said stem portion of the rivet, but smaller than the diameter of said head portion of the rivet; and a revolving roller located near said hopper across said rivet-feeding route, said revolving roller provided with a groove along an axial direction on the exterior thereof; and said rivet-inserting device including a rivet-receiving wheel having a plurality of flanges installed on both sides of a core portion, said rivet-receiving wheel being provided with a series of grooves for holding said rivets one by one therein, above each periphery of said flanges, and said rivet-receiving wheel rotatably installed horizontally on a gear box;

a guide member shaped to have a gradually increased radius towards an exit of said rivet-holding belt, said guide member disposed between said flanges of said rivet-receiving wheel, said guide member guiding said rivet-holding belt along said rivet-receiving wheel; and a rivet-squeezing member installed facing a peripheral portion of said rivet-receiving wheel, and pressing said rivets inserted in said grooves of said rivet-receiving wheel into said holding holes of said rivet-holding belt.

2. The rivet-inserting device for inserting multiples of rivets into a rivet-holding belt according to claim 1, wherein said aligning device for vertically aligning in series said rivets comprises:

a hopper containing said rivets to be supplied;

an aligning feeder adapted to move up and down through an internal portion of said hopper, said aligning feeder having an aligning slit for receiving head portions of said rivets so as to align vertically said rivets in series;

said aligning feeder having an inclined surface on a top position for transferring said rivets aligned vertically in said aligning slit towards a delivering portion to said rivet-receiving wheel; and a rise up and down driving mechanism connected to said aligning feeder.

3. The rivet-inserting device for inserting multiples of rivets into a rivet-holding belt according to claim 2, wherein said rise converting mechanism for converting revolving motion to an up and down motion and that said motion converting mechanism is connected to a driving shaft for driving said driving mechanism.

* * * * *